(12) United States Patent
Kwon et al.

(10) Patent No.: US 10,847,113 B2
(45) Date of Patent: Nov. 24, 2020

(54) METHOD OF DRIVING A LIQUID CRYSTAL DISPLAY PANEL AND LIQUID CRYSTAL DISPLAY DEVICE EMPLOYING THE SAME

(71) Applicant: Samsung Display Co., Ltd., Yongin-si (KR)

(72) Inventors: Sangan Kwon, Cheonan-si (KR); Junpyo Lee, Asan-si (KR); Kyunho Kim, Hwaseong-si (KR); Sungjin Kim, Gwangju (KR); Yong-Jin Shin, Asan-si (KR); Neung-Beom Lee, Hwaseong-si (KR); Kyung-Hwa Lim, Yongin-si (KR); Jinhyuk Jang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/263,257

(22) Filed: Jan. 31, 2019

(65) Prior Publication Data

US 2019/0244580 A1     Aug. 8, 2019

(30) Foreign Application Priority Data

Feb. 6, 2018  (KR) .................. 10-2018-0014540

(51) Int. Cl.
*G09G 3/36* (2006.01)
*G02F 1/1362* (2006.01)
(Continued)

(52) U.S. Cl.
CPC ......... *G09G 3/3696* (2013.01); *G02F 1/1368* (2013.01); *G02F 1/136213* (2013.01);
(Continued)

(58) Field of Classification Search
CPC .. G09G 3/3696; G09G 3/3406; G09G 3/3677; G09G 3/3688; G09G 2300/0819;
(Continued)

(56) References Cited

U.S. PATENT DOCUMENTS

2016/0133212 A1*  5/2016  Jung ................... G09G 3/3696
                                                 345/691
2016/0189654 A1*  6/2016  Kim .................... G09G 3/3685
                                                 345/690

(Continued)

FOREIGN PATENT DOCUMENTS

KR     10-2010-0032184 A    3/2010
KR     10-2015-0086959 A    7/2015

*Primary Examiner* — Lixi C Simpson
(74) *Attorney, Agent, or Firm* — Lewis Roca Rothgerber Christie LLP

(57) ABSTRACT

A method of driving a liquid crystal display panel is provided. The liquid crystal display panel includes: a liquid crystal display pixel including a liquid crystal structure including a pixel electrode, a liquid crystal layer, and a common electrode; a switching transistor connected between the pixel electrode of the liquid crystal structure and a data-line; and a storage capacitor connected to the pixel electrode of the liquid crystal structure. The method includes: calculating an accumulated driving time of the liquid crystal display panel by accumulating a driving time of the liquid crystal display panel; determining whether or not the accumulated driving time has reached a deterioration reference time; and when the accumulated driving time is determined to have reached the deterioration reference time, changing a gate-off voltage applied to a gate terminal of the switching transistor and a common voltage applied to the common electrode.

21 Claims, 12 Drawing Sheets

(51) Int. Cl.
*G02F 1/1368* (2006.01)
*G09G 3/34* (2006.01)

(52) U.S. Cl.
CPC ......... *G09G 3/3406* (2013.01); *G09G 3/3677* (2013.01); *G09G 3/3688* (2013.01); *G02F 2201/121* (2013.01); *G02F 2201/123* (2013.01); *G09G 2300/0819* (2013.01); *G09G 2310/08* (2013.01); *G09G 2320/045* (2013.01); *G09G 2320/048* (2013.01)

(58) Field of Classification Search
CPC ......... G09G 2310/08; G09G 2320/045; G09G 2320/048; G02F 1/136213; G02F 1/1368; G02F 2201/121; G02F 2201/123
See application file for complete search history.

(56) References Cited

U.S. PATENT DOCUMENTS

2017/0140708 A1   5/2017   Park et al.
2017/0148369 A1*  5/2017   Park .................... G09G 3/2007

\* cited by examiner

METHOD OF DRIVING A LIQUID CRYSTAL DISPLAY PANEL AND LIQUID CRYSTAL DISPLAY DEVICE EMPLOYING THE SAME

CROSS-REFERENCE TO RELATED APPLICATION

This application claims priority to and the benefit of Korean Patent Application No. 10-2018-0014540, filed on Feb. 6, 2018 in the Korean Intellectual Property Office (KIPO), the entire content of which is incorporated herein by reference.

BACKGROUND

1. Field

Aspects of example embodiments of the present invention relate generally to a display device.

2. Description of the Related Art

Generally, a liquid crystal display device includes a liquid crystal display panel that includes a liquid crystal display pixel, a backlight (e.g., a backlight unit) that provides light to the liquid crystal display panel, a backlight driver (e.g., a backlight unit driving circuit) that drives the backlight, and a liquid crystal display panel driver (e.g., a liquid crystal display panel driving circuit) that drives the liquid crystal display panel. The liquid crystal display pixel includes a switching transistor, a storage capacitor, a liquid crystal structure, etc. The liquid crystal structure includes a pixel electrode to which a pixel voltage is applied, a common electrode to which a common voltage is applied, and a liquid crystal layer disposed between the pixel electrode and the common electrode.

A color filter may be disposed over the liquid crystal structure or under the liquid crystal structure. The liquid crystal display pixel implements (or displays) a grayscale (or gray level) by adjusting light based on a voltage difference between the pixel voltage and the common voltage. A color of the light (e.g., a color of the displayed gray level or display light) is determined by the color filter through which the light passes.

For example, the liquid crystal display pixel including a red color filter may be referred to as a red color display pixel, the liquid crystal display pixel including a green color filter may be referred to as a green color display pixel, and the liquid crystal display pixel including a blue color filter may be referred to as a blue color display pixel. Generally, to prevent or mitigate deterioration of the liquid crystal structure (e.g., the liquid crystal layer), the liquid crystal display device performs inversion driving, which includes inverting the polarity of the pixel voltage with respect to the common voltage on a regular cycle (e.g., every frame or once a frame).

The switching transistor included in the liquid crystal display pixel may deteriorate as an accumulated driving time of the liquid crystal display pixel increases. Deterioration of the switching transistor causes an increased threshold voltage of the switching transistor, and the increased threshold voltage of the switching transistor causes decreased luminance of the liquid crystal display pixel even when the same gate-on voltage is applied to the switching transistor.

In addition, when a planarization layer (e.g., an organic layer) is formed over the color filter, the light passing through the color filter and the planarization layer generates charges due to ion impurities in the planarization layer. The charges are trapped near the pixel electrode of the liquid crystal structure and may become a residual DC charge. The residual DC charge increases leakage current of the switching transistor, and thus, the luminance of the liquid crystal display pixel is further reduced. Because the light passing through the blue color filter (i.e., blue color light) has relatively high energy because blue color light has a relatively short wavelength, the light passing through the blue color filter causes more residual DC charge (e.g., causes a greater residual DC charge) as compared to the light passing through the red color filter (i.e., red color light) or the light passing through the green color filter (i.e., green color light). As the accumulated driving time of the liquid crystal display panel increases, the luminance of the blue color display pixel greatly decreases as compared to (e.g., decreases faster than) the luminance of the red color display pixel or the luminance of the green color display pixel. As a result, a phenomenon (hereinafter referred to as a yellowing phenomenon) in which an image displayed by the liquid crystal display panel becomes slightly yellow as the accumulated driving time of the liquid crystal display panel increases may occur in a liquid crystal display device according to the related art.

SUMMARY

Some example embodiments of the present invention provide a method of driving a liquid crystal display panel that can prevent or mitigate a yellowing phenomenon in which an image displayed by the liquid crystal display panel becomes slightly yellow as an accumulated driving time of the liquid crystal display panel increases.

Some example embodiments of the present invention provide a liquid crystal display device that employs the method of driving the liquid crystal display panel that can prevent or mitigate the yellowing phenomenon.

According to an example embodiment of the present invention, a method of driving a liquid crystal display panel is provided. The liquid crystal display panel includes: a liquid crystal display pixel including a liquid crystal structure including a pixel electrode, a liquid crystal layer, and a common electrode; a switching transistor connected between the pixel electrode of the liquid crystal structure and a data-line; and a storage capacitor connected to the pixel electrode of the liquid crystal structure. The method includes: calculating an accumulated driving time of the liquid crystal display panel by accumulating a driving time of the liquid crystal display panel; determining whether or not the accumulated driving time has reached a deterioration reference time; and when the accumulated driving time is determined to have reached the deterioration reference time, changing a gate-off voltage applied to a gate terminal of the switching transistor and a common voltage applied to the common electrode.

A gate-on voltage applied to the gate terminal of the switching transistor may not be changed.

According to an embodiment of the present invention, a method of driving a liquid crystal display panel is provided. The liquid crystal display panel includes: a liquid crystal display pixel including a liquid crystal structure including a pixel electrode, a liquid crystal layer, and a common electrode; a switching transistor connected between the pixel electrode of the liquid crystal structure and a data-line; and a storage capacitor connected to the pixel electrode of the liquid crystal structure. The method includes: calculating an accumulated driving time of the liquid crystal display panel by accumulating a driving time of the liquid crystal display panel; determining whether or not the accumulated driving time has reached first through (k)-th deterioration reference times; and when the accumulated driving time is determined to have sequentially reached the first through (k)-th deterioration reference times, sequentially changing a gate-off voltage applied to a gate terminal of the switching transistor and a common voltage applied to the common electrode. K is an integer greater than or equal to 2.

A gate-on voltage applied to the gate terminal of the switching transistor may not be changed.

The gate-off voltage may be sequentially reduced as the accumulated driving time sequentially reaches the first through (k)-th deterioration reference times, and a voltage difference between the gate-on voltage and the gate-off voltage may be sequentially increased as the gate-off voltage is sequentially reduced.

The gate-off voltage may be sequentially reduced in the order of first through (k)-th gate-off voltages as the accumulated driving time sequentially reaches the first through (k)-th deterioration reference times, and the first through (k)-th gate-off voltages may be mapped to the first through (k)-th deterioration reference times, respectively.

The gate-off voltage may be sequentially reduced by a reduction amount as the accumulated driving time sequentially reaches the first through (k)-th deterioration reference times.

The reduction amount may be constant as the accumulated driving time sequentially reaches the first through (k)-th deterioration reference times.

The reduction amount may differ as the accumulated driving time sequentially reaches the first through (k)-th deterioration reference times.

The common voltage may be sequentially reduced as the accumulated driving time sequentially reaches the first through (k)-th deterioration reference times.

The common voltage may be sequentially reduced in the order of first through (k)-th common voltages as the accumulated driving time sequentially reaches the first through (k)-th deterioration reference times, and the first through (k)-th common voltages may be mapped to the first through (k)-th deterioration reference times, respectively.

The common voltage may be sequentially reduced by a reduction amount as the accumulated driving time sequentially reaches the first through (k)-th deterioration reference times.

The reduction amount may be constant as the accumulated driving time sequentially reaches the first through (k)-th deterioration reference times.

The reduction amount may differ as the accumulated driving time sequentially reaches the first through (k)-th deterioration reference times.

According to an embodiment of the present invention, a liquid crystal display device includes: a liquid crystal display panel; a backlight configured to provide light to the liquid crystal display panel; a backlight driver configured to drive the backlight; and a liquid crystal display panel driver configured to drive the liquid crystal display panel. The liquid crystal display panel includes: a liquid crystal display pixel including a liquid crystal structure including a pixel electrode, a liquid crystal layer, and a common electrode; a switching transistor connected between the pixel electrode of the liquid crystal structure and a data-line; and a storage capacitor connected to the pixel electrode of the liquid crystal structure. The liquid crystal display panel driver is configured to calculate an accumulated driving time of the liquid crystal display panel by accumulating a driving time of the liquid crystal display panel and to reduce a gate-off voltage applied to a gate terminal of the switching transistor and a common voltage applied to the common electrode when the accumulated driving time reaches a deterioration reference time. The liquid crystal display panel driver is configured to not change a gate-on voltage applied to the gate terminal of the switching transistor.

The liquid crystal display panel driver may include: a scan driver configured to provide a scan signal corresponding to the gate-off voltage and the gate-on voltage to the liquid crystal display panel via scan-lines; a data driver configured to provide a data signal corresponding to a pixel voltage to the liquid crystal display panel via data-lines; a timing controller configured to control the scan driver and the data driver; a power manager configured to provide source power to the scan driver, the data driver, and the timing controller; and a voltage adjuster configured to reduce the common voltage and the gate-off voltage based on the accumulated driving time by interacting with the scan driver and the power manager.

According to an embodiment of the present invention, a liquid crystal display device includes: a liquid crystal display panel; a backlight configured to provide light to the liquid crystal display panel; a backlight driver configured to drive the backlight; and a liquid crystal display panel driver configured to drive the liquid crystal display panel. The liquid crystal display panel includes: a liquid crystal display pixel including a liquid crystal structure including a pixel electrode, a liquid crystal layer, and a common electrode; a switching transistor connected between the pixel electrode of the liquid crystal structure and a data-line; and a storage capacitor connected to the pixel electrode of the liquid crystal structure. The liquid crystal display panel driver is configured to calculate an accumulated driving time of the liquid crystal display panel by accumulating a driving time of the liquid crystal display panel and to sequentially reduce a gate-off voltage applied to a gate terminal of the switching transistor and a common voltage applied to the common electrode of the liquid crystal structure when the accumulated driving time sequentially reaches first through (k)-th deterioration reference times. K is an integer greater than or equal to 2. The liquid crystal display panel driver is configured to not change a gate-on voltage applied to the gate terminal of the switching transistor.

The liquid crystal display panel driver may include: a scan driver configured to provide a scan signal corresponding to the gate-off voltage and the gate-on voltage to the liquid crystal display panel via scan-lines; a data driver configured to provide a data signal corresponding to a pixel voltage to the liquid crystal display panel via data-lines; a timing controller configured to control the scan driver and the data driver; a power manager configured to provide source power to the scan driver, the data driver, and the timing controller; and a voltage adjuster configured to reduce the common voltage and the gate-off voltage based on the accumulated driving time by interacting with the scan driver and the power manager.

The liquid crystal display panel driver may be configured to sequentially reduce the gate-off voltage in the order of first through (k)-th gate-off voltages as the accumulated driving time sequentially reaches the first through (k)-th deterioration reference times, and the first through (k)-th gate-off voltages may be mapped to the first through (k)-th deterioration reference times, respectively.

The liquid crystal display panel driver may be configured to sequentially reduce the gate-off voltage by a reduction amount as the accumulated driving time sequentially reaches the first through (k)-th deterioration reference times.

The liquid crystal display panel driver may be configured to sequentially reduce the common voltage in the order of first through (k)-th common voltages as the accumulated driving time sequentially reaches the first through (k)-th deterioration reference times, and the first through (k)-th common voltages may be mapped to the first through (k)-th deterioration reference times, respectively.

The liquid crystal display panel driver may be configured to sequentially reduce the common voltage by a reduction amount as the accumulated driving time sequentially reaches the first through (k)-th deterioration reference times.

A method of driving a liquid crystal display panel according to example embodiments may effectively prevent or mitigate a yellowing phenomenon in which an image displayed by the liquid crystal display panel becomes slightly yellow as an accumulated driving time of the liquid crystal display panel increases. The method of driving the liquid crystal display panel may calculate the accumulated driving time of the liquid crystal display panel by accumulating a driving time of the liquid crystal display panel and may change (e.g., reduce) a gate-off voltage applied to a gate terminal of a switching transistor included in a liquid crystal display pixel and a common voltage applied to a common electrode of a liquid crystal structure included in a liquid crystal display pixel when the accumulated driving time of the liquid crystal display panel reaches a deterioration reference time. In other embodiments, the method of driving the liquid crystal display panel may calculate the accumulated driving time of the liquid crystal display panel by accumulating the driving time of the liquid crystal display panel and may sequentially change (e.g., reduce) the gate-off voltage and the common voltage when the accumulated driving time of the liquid crystal display panel sequentially reaches first through (k)-th deterioration reference times.

In addition, a liquid crystal display device that employs the method of driving the liquid crystal display panel according to example embodiments may provide a high-quality image to a user (or viewer) even when the liquid crystal display panel deteriorates.

BRIEF DESCRIPTION OF THE DRAWINGS

The present invention will be more clearly understood from the following detailed description of illustrative, non-limiting example embodiments in conjunction with the accompanying drawings.

DETAILED DESCRIPTION

Figure 1:
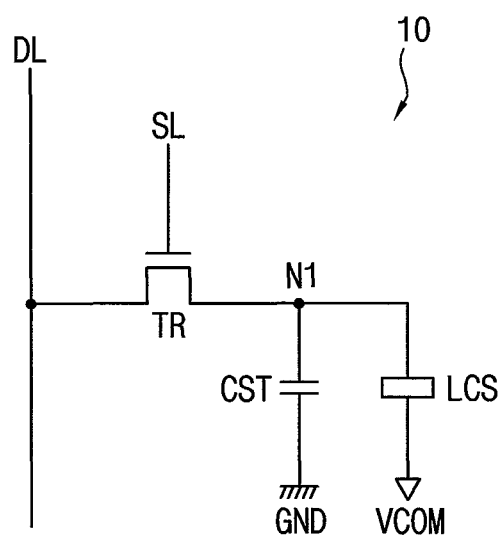
FIG. 1 is a diagram illustrating an example embodiment of a liquid crystal display pixel included in a liquid crystal display panel.

Hereinafter, the present invention will be explained in detail with reference to example embodiments shown in the accompanying drawings.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the term "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The liquid crystal display panel driver, backlight driver, and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the liquid crystal display panel driver and/or backlight driver may be formed on one integrated circuit (IC) chip or on separate IC chips. Further, the various components of the liquid crystal display panel driver and/or backlight driver may be implemented on a flexible printed circuit film, a tape carrier package (TCP), a printed circuit board (PCB), or formed on a same substrate as the liquid crystal display panel driver and/or backlight driver. Further, the various components of the liquid crystal display panel driver and/or backlight driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the example embodiments of the present invention.

Figure 2:
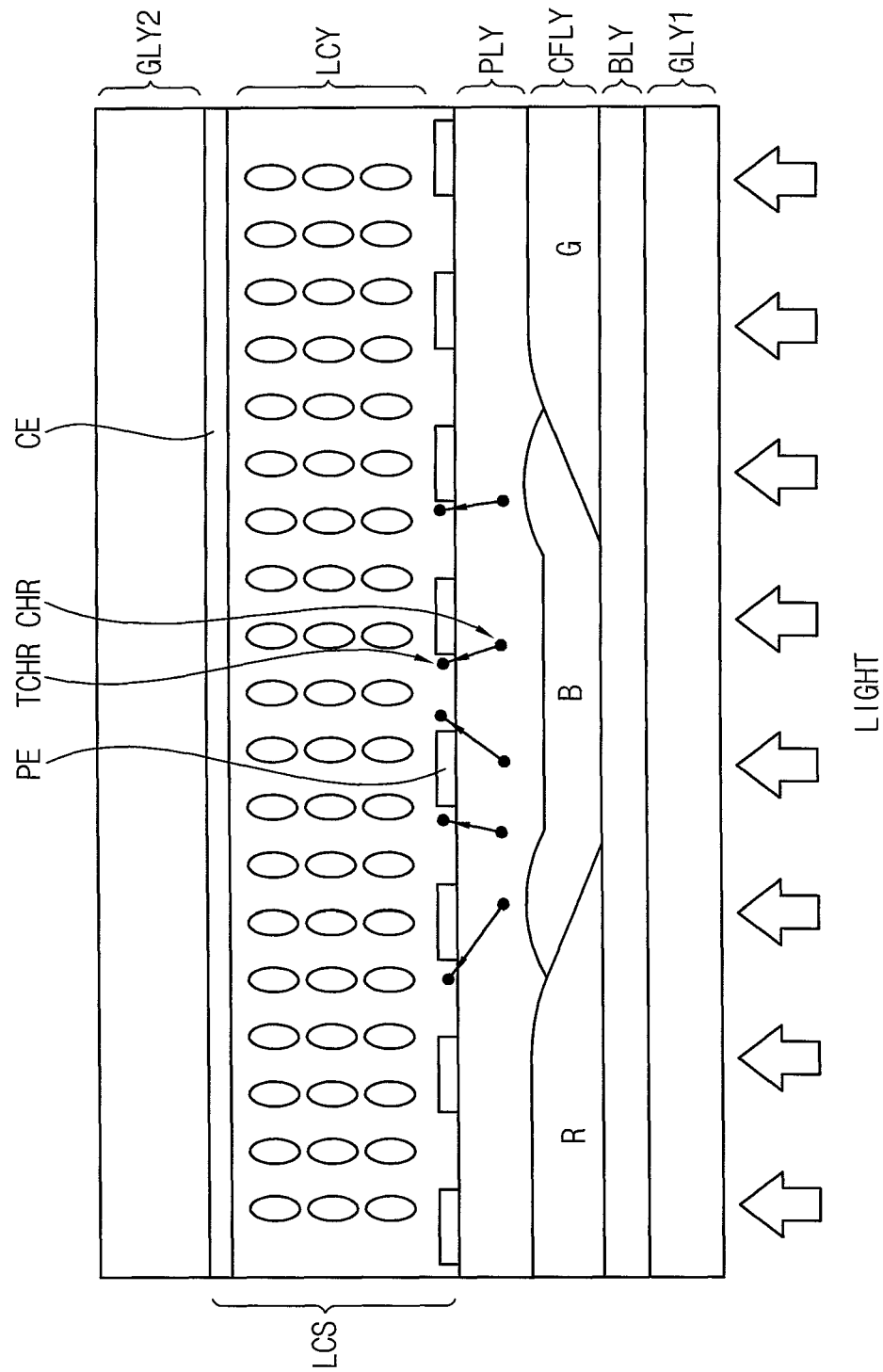
FIG. 2 is a diagram illustrating a portion of a cross section of the liquid crystal display panel shown in FIG. 1.

FIG. 1 is a diagram illustrating an example embodiment of a liquid crystal display pixel included in a liquid crystal display panel, and FIG. 2 is a diagram illustrating a portion of a cross section of the liquid crystal display panel shown in FIG. 1.

Referring to FIGS. 1 and 2, the liquid crystal display pixel 10 included in the liquid crystal display panel may include a switching transistor TR, a storage capacitor CST, and a liquid crystal structure LCS.

The switching transistor TR may include a first terminal that is connected to a data-line DL, a second terminal that is connected to a first node N1 (e.g., a pixel electrode PE of the liquid crystal structure LCS), and a gate terminal that is connected to a scan-line SL. Thus, the switching transistor TR may be turned on when a scan signal transferred via the scan-line SL has a gate-on voltage, and in the turn-on state, the switching transistor TR may transfer a data signal (e.g., a pixel voltage) transferred via the data-line DL to the first node N1. The switching transistor TR may be turned off when the scan signal transferred via the scan-line SL has a gate-off voltage VSS, and in the turned off state, the switching transistor TR may electrically separate (e.g., electrically isolate) the data-line DL from the first node N1.

The storage capacitor CST may include a first terminal (e.g., a first electrode) that is connected to the first node N1 and a second terminal (e.g., a second electrode) that is connected to a ground voltage GND. Thus, the storage capacitor CST may store the transferred data signal (e.g., the pixel voltage) when the switching transistor TR is turned on. The liquid crystal structure LCS may be located between the first node N1 and a common voltage VCOM. The liquid crystal structure LCS may include a first terminal (e.g., the pixel electrode PE) that is connected to the first node N1 and a second terminal (e.g., a common electrode CE) that is connected to the common voltage VCOM. Generally, in the liquid crystal display pixel 10, polarity of the pixel voltage may be inverted with respect to the common voltage VCOM on a regular cycle.

The liquid crystal structure LCS may include the pixel electrode PE to which the data signal (e.g., the pixel voltage) is applied and which is connected to the first node N1, the common electrode CE to which the common voltage VCOM is applied, and a liquid crystal layer LCY which is disposed between the pixel electrode PE and the common electrode CE. In addition, a color filter R, G, and/or B may be disposed over and/or under the liquid crystal structure LCS.

As illustrated in FIG. 2, the liquid crystal display panel may include a lower substrate GLY1, a buffer layer BLY, a color filter layer CFLY, a planarization layer PLY, the liquid crystal structure LCS, and an upper substrate GLY2. The liquid crystal structure LCS may include the pixel electrode PE, the liquid crystal layer LCY, and the common electrode CE. The lower substrate GLY1 may be disposed over a backlight (e.g., a backlight unit). Thus, light (indicated by LIGHT in FIG. 2) emitted by the backlight may enter (or be incident on) a bottom of the lower substrate GLY1. The buffer layer BLY may be disposed over the lower substrate GLY1. The color filter layer CFLY may be disposed over the buffer layer BLY. The color filter layer CFLY may include a blue color filter B, a red color filter R, and/or a green color filter G. A region where the blue color filter B is located may be the blue color display pixel 10, a region where the red color filter R is located may be the red color display pixel 10, and a region where the green color filter G is located may be the green color display pixel 10. The planarization layer PLY may be disposed over the color filter layer CFLY. The liquid crystal structure LCS may be disposed over the planarization layer PLY. For example, the pixel electrode PE may be disposed over the planarization layer PLY, the liquid crystal layer LCY may be disposed over the pixel electrode PE, and the common electrode CE may be disposed over the liquid crystal layer LCY. However, a structure of the liquid crystal structure LCS is not limited thereto. In other embodiments, the common electrode CE may be disposed over the planarization layer PLY, the liquid crystal layer LCY may be disposed over the common electrode CE, and the pixel electrode PE may be disposed over the liquid crystal layer LCY. The upper substrate GLY2 may be disposed over the liquid crystal structure LCS. Thus, the light emitted by the backlight may be emitted from a top of the upper substrate GLY2.

The liquid crystal display pixel 10 implements (or displays) a grayscale (or gray level) by adjusting the light (indicated by LIGHT) based on a voltage difference between the pixel voltage applied to the pixel electrode PE and the common voltage VCOM applied to the common electrode CE of the liquid crystal structure LCS. In some embodiments, a color of the light is determined by the color filter R, G, and/or B through which the light passes. Usually, the switching transistor TR deteriorates as the accumulated driving time of the liquid crystal display pixel 10 increases. Deterioration of the switching transistor TR causes an increase of a threshold voltage of the switching transistor TR, and the increase of the threshold voltage of the switching transistor TR causes a decrease of luminance of the liquid crystal display pixel 10 even when the same gate-on voltage is applied to the switching transistor TR. Further, the deterioration of the switching transistor TR changes a luminance curve of the liquid crystal display pixel 10 with respect to the common voltage VCOM. In addition, in embodiments in which the planarization layer PLY is formed over the color filter R, G, and B, the light having passed through the color filter R, G, and B generates charges CHR in the planarization layer PLY due to ion impurities in the planarization layer PLY.

When the charges CHR are trapped near the pixel electrode PE of the liquid crystal structure LCS, they become residual DC charges TCHR. Residual DC charges TCHR increase leakage current of the switching transistor TR cause the luminance of the liquid crystal display pixel 10 to decrease. For example, because the light having passed through the blue color filter B has relatively high energy because the light having passed through the blue color filter B has a relatively short wavelength, the light having passed through the blue color filter B causes more residual DC charges TCHR as compared to the light having passed through the red color filter R or the light having passed through the green color filter G. Thus, as the accumulated driving time of the liquid crystal display panel increases, the luminance of the blue color display pixel 10 is greatly decreased as compared to the luminance of the red color display pixel 10 or the luminance of the green color display pixel 10. For example, the residual DC charges TCHR have a relatively substantial effect on the luminance curve of the blue color display pixel 10 with respect to the common voltage VCOM as compared to the luminance curve of the red color display pixel 10 with respect to the common voltage VCOM and the luminance curve of the green color display pixel 10 with respect to the common voltage VCOM. Accordingly, a yellowing phenomenon may occur in the liquid crystal display panel as the accumulated driving time of the liquid crystal display panel increases, and the yellowing phenomenon is relatively noticeable in a low-grayscale image.

Figure 3:
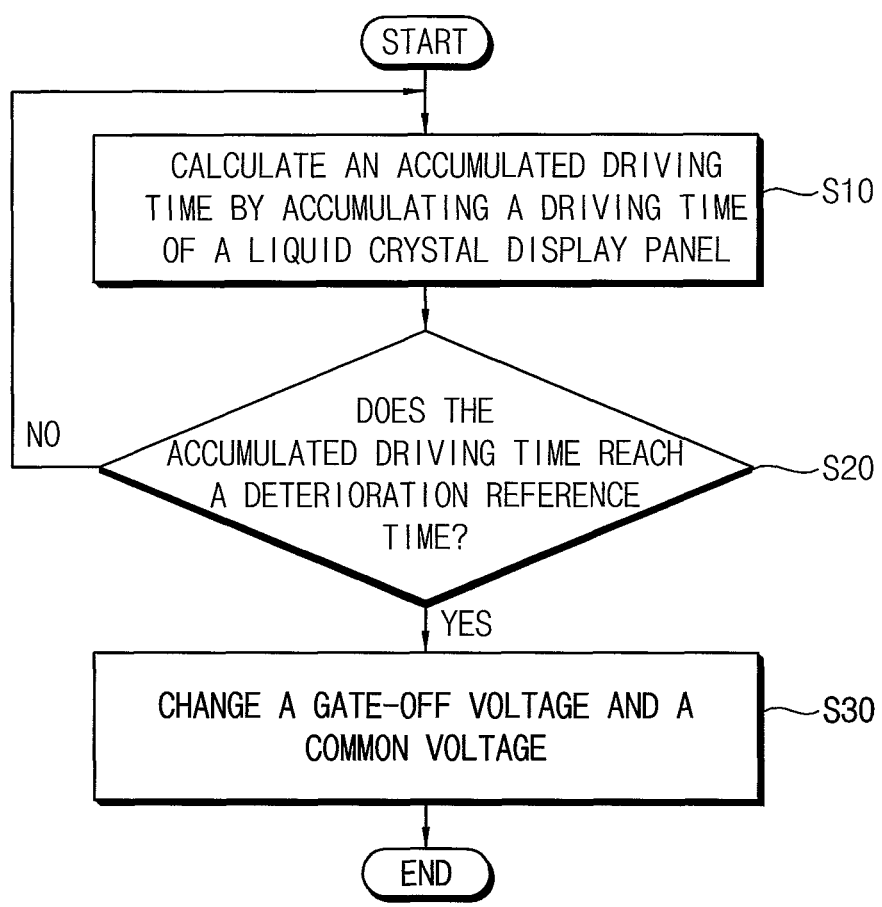
FIG. 3 is a flowchart illustrating a method of driving a liquid crystal display panel according to an example embodiment.
Figure 4A:
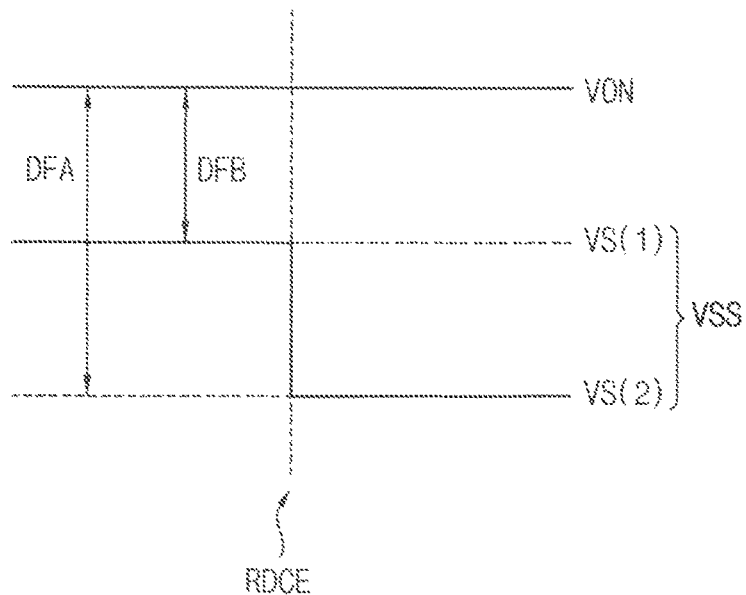
FIGS. 4A and 4B are diagrams illustrating an example embodiment in which a common voltage and a gate-off voltage applied to a liquid crystal display pixel are adjusted according to the method shown in FIG. 3.
Figure 4B:
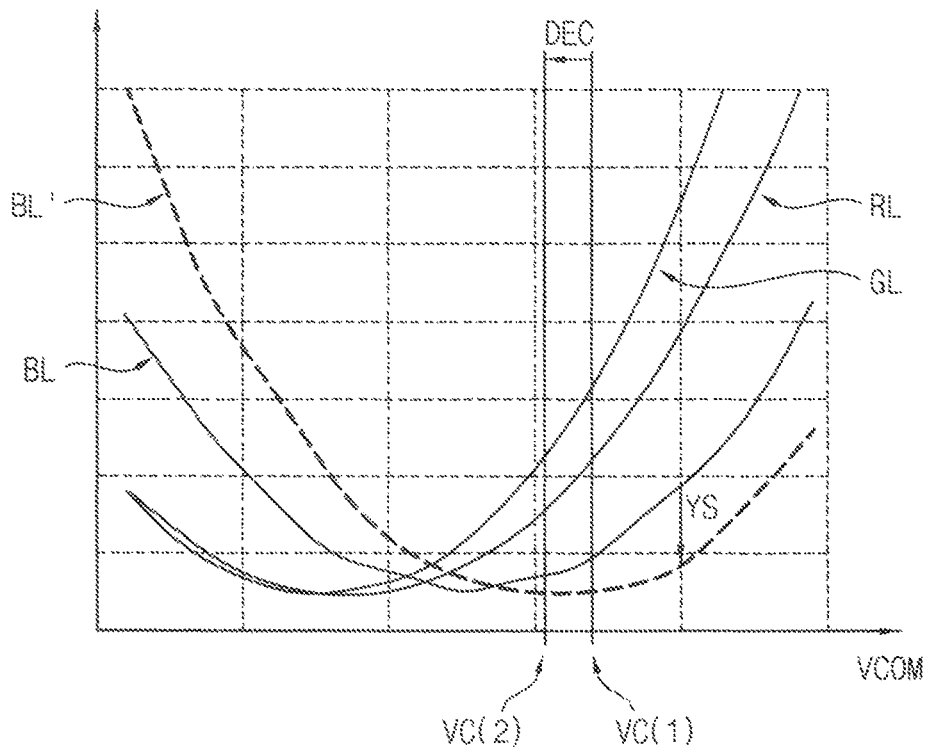

FIG. 3 is a flowchart illustrating a method of driving a liquid crystal display panel according to an example embodiment, and FIGS. 4A and 4B are diagrams illustrating an example embodiment in which a common voltage and a gate-off voltage applied to a liquid crystal display pixel are adjusted according to the method shown in FIG. 3.

The liquid crystal display panel that includes the liquid crystal display pixel 10 including the liquid crystal structure LCS, which includes a pixel electrode PE, a liquid crystal layer LCY, and a common electrode CE, the switching transistor TR, which is connected between the pixel electrode PE of the liquid crystal structure LCS and a data-line DL, and the storage capacitor CST, which is connected to the pixel electrode PE of the liquid crystal structure LCS may be driven according to the method shown in FIG. 3.

The method shown in FIG. 3 may calculate an accumulated driving time of the liquid crystal display panel by accumulating (or calculating) a driving time of the liquid crystal display panel (S10). For example, the method of FIG. 3 may calculate the accumulated driving time of the liquid crystal display panel by increasing the accumulated driving time of the liquid crystal display panel by one for every hour the liquid crystal display panel is driven. For this operation, the method of FIG. 3 may write the accumulated driving time of the liquid crystal display panel into a memory block including a non-volatile memory device (e.g., a flash memory device, etc.) and may read the accumulated driving time of the liquid crystal display panel from the memory block when the liquid crystal display panel is booted. Because the accumulated driving time of the liquid crystal display panel is updated and stored in the memory block, the method of FIG. 3 may check the accumulated driving time of the liquid crystal display panel in real-time by accessing (or reading) the memory block.

The method of FIG. 3 may determine whether or not the accumulated driving time of the liquid crystal display panel reaches (is greater than or equal to) a deterioration reference time (S20). In some embodiments, when the accumulated driving time of the liquid crystal display panel does not reach (is less than) the deterioration reference time, the method of FIG. 3 may continue to update the accumulated driving time of the liquid crystal display panel (e.g., may continue to accumulate the driving time of the liquid crystal display panel). When the accumulated driving time of the liquid crystal display panel reaches (is greater than or equal to) the deterioration reference time, the method of FIG. 3 may change (e.g., may reduce) the gate-off voltage VSS applied to the gate terminal of the switching transistor TR and the common voltage VCOM applied to the common electrode CE (S30). In example embodiments, the method of FIG. 3 may not change the gate-on voltage VON applied to the gate terminal of the switching transistor TR even when the accumulated driving time of the liquid crystal display panel reaches the deterioration reference time. In other words, the method of FIG. 3 may maintain the gate-on voltage VON applied to the gate terminal of the switching transistor TR constant or substantially constant.

As illustrated in FIG. 4A, when the accumulated driving time of the liquid crystal display panel reaches the deterioration reference time, the method of FIG. 3 reduces the gate-off voltage VSS from a first gate-off voltage VS(1) to a second gate-off voltage VS(2). A voltage difference DFA between the gate-on voltage VON and the gate-off voltage VSS (e.g., the second gate-off voltage VS(2)) after the accumulated driving time of the liquid crystal display panel reaches the deterioration reference time may be greater than a voltage difference DFB between the gate-on voltage VON and the gate-off voltage VSS (e.g., the first gate-off voltage VS(1)) before the accumulated driving time of the liquid crystal display panel reaches the deterioration reference time. As a result, a kickback phenomenon occurring after the accumulated driving time of the liquid crystal display panel reaches the deterioration reference time is greater than the kickback phenomenon occurring before the accumulated driving time of the liquid crystal display panel reaches the deterioration reference time. The kickback phenomenon occurs when a state of the switching transistor TR is changed from a turn-on state to a turn-off state (indicated RDCE). By reducing the gate-off voltage VSS applied to the gate terminal of the switching transistor TR, the method of FIG. 3 may sufficiently eliminate the residual DC charges TCHR that are trapped near the pixel electrode PE of the liquid crystal structure LCS.

In addition, as illustrated in FIG. 4B, the switching transistor TR may deteriorate as the accumulated driving time of the liquid crystal display panel increases, and the deterioration of the switching transistor TR may change the luminance curves BL, GL, and RL of the liquid crystal display pixel 10 with respect to the common voltage VCOM (e.g., may shift the luminance curves BL, GL, and RL to the right). For convenience of description, only the luminance curve BL of the blue color display pixel 10 is illustrated as changing illustrated in FIG. 4B, it should be understood that the luminance curve RL of the red color display pixel 10 and the luminance curve GL of the green color display pixel 10 also change as the accumulated driving time of the liquid crystal display panel increases. Because the effect of the residual DC charges TCHR in the red color display pixel 10 and the green color display pixel 10 is smaller than the effect of the residual DC charges TCHR in the blue color display pixel 10, the luminance curve RL of the red color display pixel 10 and the luminance curve GL of the green color display pixel 10 may only slightly change as compared to the luminance curve BL of the blue color display pixel 10. For example, as the liquid crystal display panel deteriorates, the luminance curve BL of the blue color display pixel 10 may change to the luminance curve BL' of the blue color display pixel 10. When the common voltage VCOM applied to the common electrode CE of the liquid crystal structure LCS is maintained as the first common voltage VC(1), the yellowing phenomenon may occur in the liquid crystal display panel (indicated by YS) because only luminance of the blue color display pixel 10 is reduced (e.g., because luminance of the blue color display pixel 10 is reduced substantially more than the luminance of the red color display pixel 10 and the luminance of the green color display pixel 10). When the common voltage VCOM applied to the common electrode CE of the liquid crystal structure LCS included in the liquid crystal display pixel 10 is reduced to the second common voltage VC(2) (indicated by DEC), the yellowing phenomenon may be prevented from occurring (or may be mitigated) in the liquid crystal display panel because a luminance reduction of the red color display pixel 10 and a luminance reduction of the green color display pixel 10 are greater than a luminance reduction of the blue color display pixel 10. In brief, when the luminance curves BL, RL, and GL of the liquid crystal display pixel 10 change as the liquid crystal display panel deteriorates, the method of FIG. 3 may effectively prevent the yellowing phenomenon from occurring in the liquid crystal display panel by reducing the common voltage VCOM applied to the common electrode CE of the liquid crystal structure LCS.

As described above, the method of FIG. 3 may prevent or substantially reduce the yellowing phenomenon in which the image displayed by the liquid crystal display panel becomes slightly yellow as the accumulated driving time of the liquid crystal display panel increases by calculating the accumulated driving time of the liquid crystal display panel by accumulating the driving time of the liquid crystal display panel and by changing (e.g., reducing) the gate-off voltage VSS applied to the gate terminal of the switching transistor TR and the common voltage VCOM applied to the common electrode CE of the liquid crystal structure LCS when the accumulated driving time of the liquid crystal display panel reaches the deterioration reference time. For example, as the liquid crystal display panel deteriorates, the method of FIG. 3 may change (e.g., may reduce) the gate-off voltage VSS applied to the gate terminal of the switching transistor TR and the common voltage VCOM applied to the common electrode CE of the liquid crystal structure LCS. Thus, the method of FIG. 3 may more effectively prevent or reduce the yellowing phenomenon as compared to a method of changing only the gate-off voltage VSS applied to the gate terminal of the switching transistor TR or a method of changing only the common voltage VCOM applied to the common electrode CE. As a result, the method of FIG. 3 may provide a high-quality image to a viewer even as the liquid crystal display panel deteriorates. In example embodiments, the method of FIG. 3 may change the common voltage VCOM applied to the common electrode CE after changing the gate-off voltage VSS applied to the gate terminal of the switching transistor TR.

Figure 5:
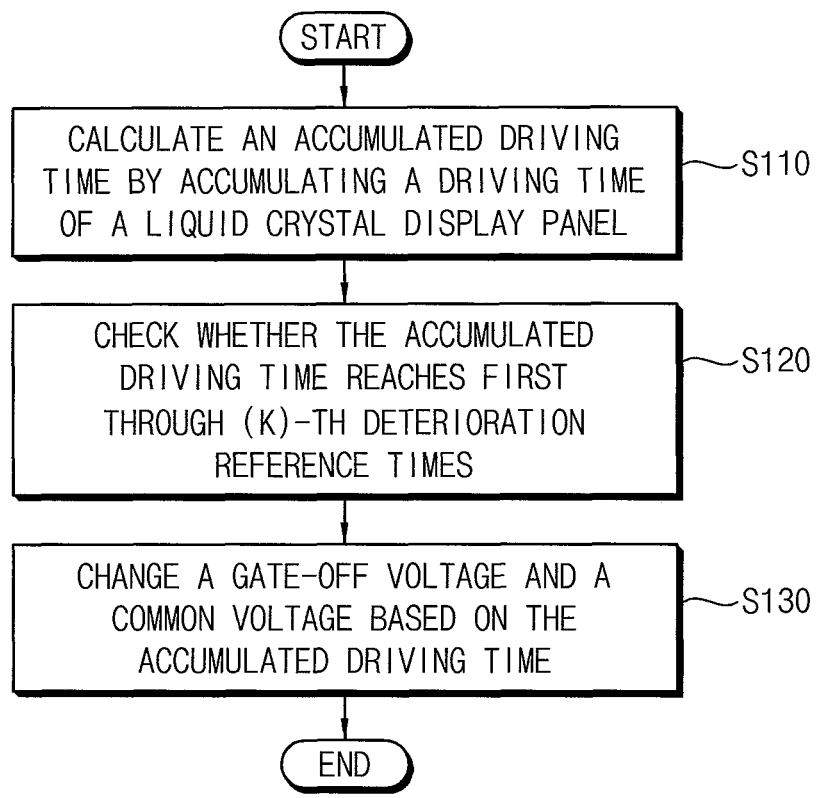
FIG. 5 is a flowchart illustrating a method of driving a liquid crystal display panel according to an example embodiment.
Figure 6:
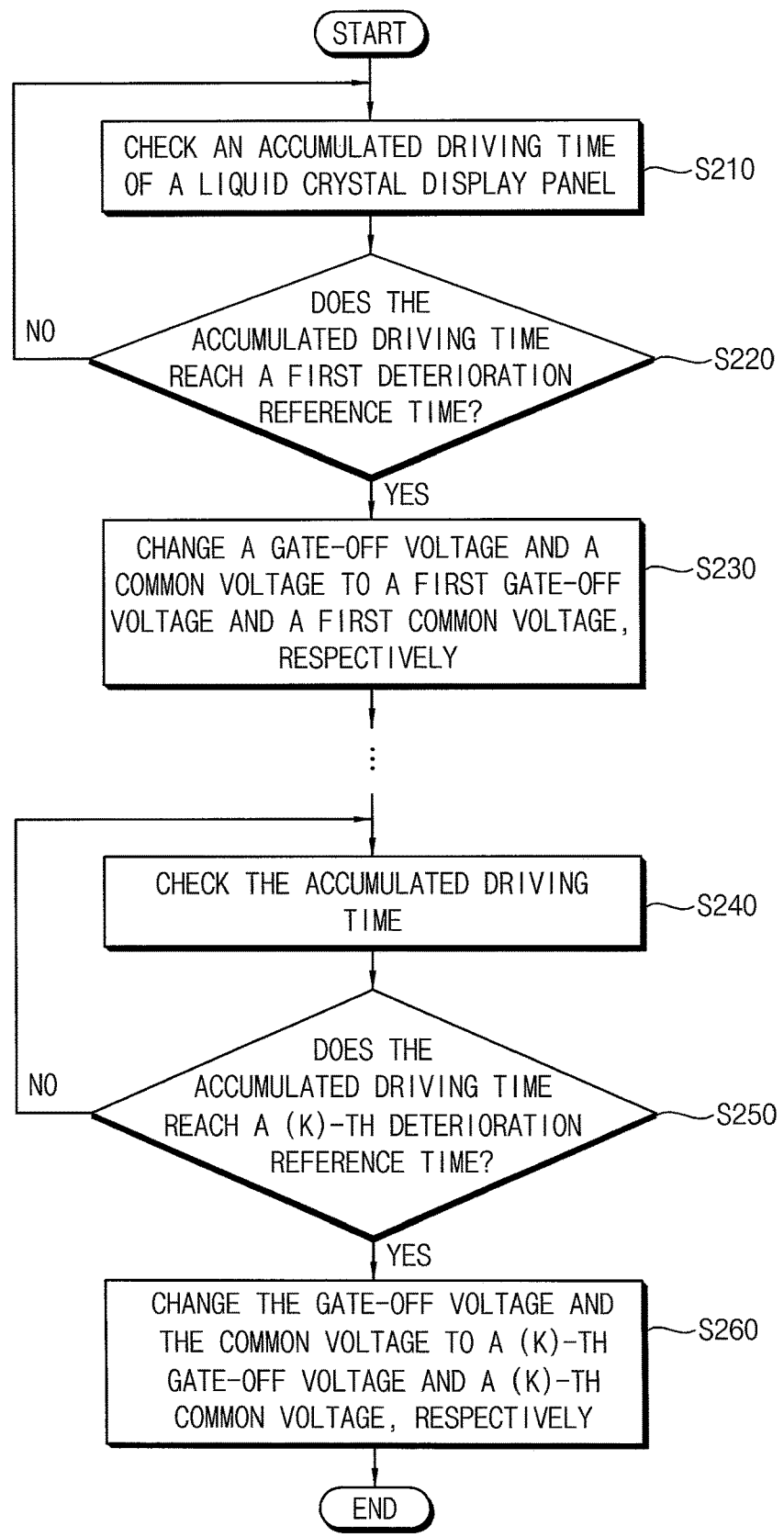
FIG. 6 is a flowchart illustrating a process in which a common voltage and a gate-off voltage applied to a liquid crystal display pixel are adjusted according to the method shown in FIG. 5.
Figure 7:
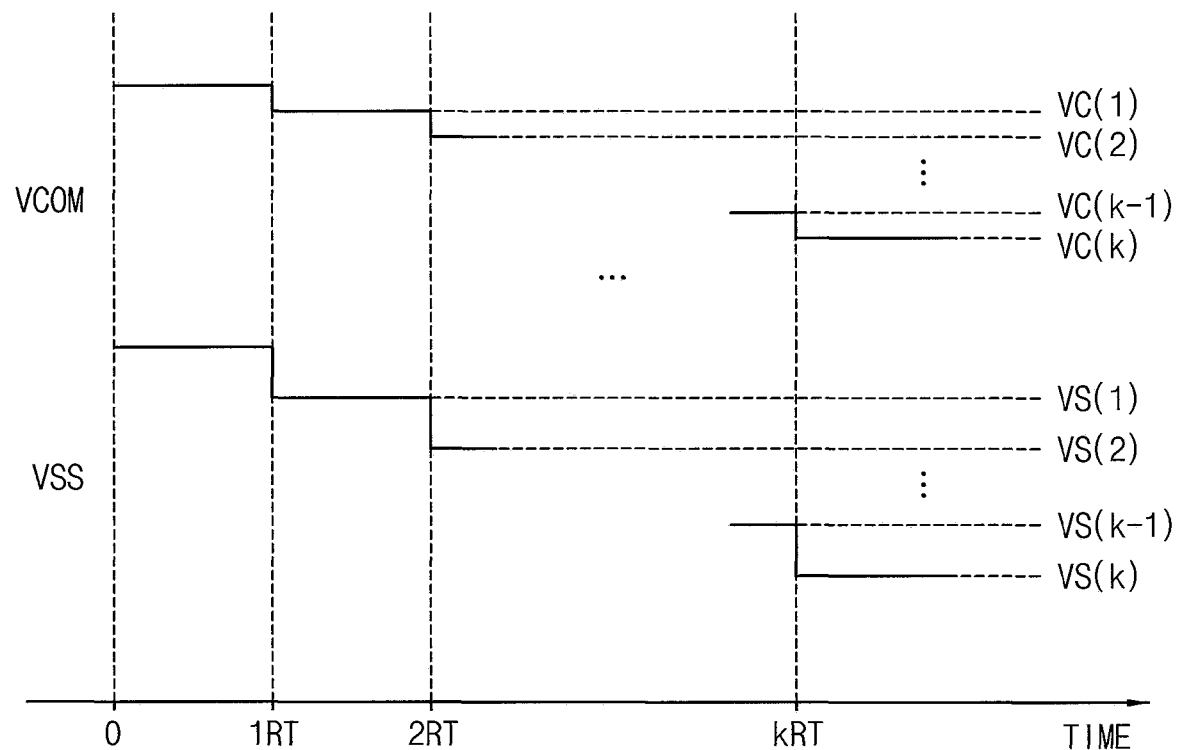
FIG. 7 is a diagram illustrating an example embodiment in which a common voltage and a gate-off voltage applied to a liquid crystal display pixel are adjusted according to the method shown in FIG. 5.

FIG. 5 is a flowchart illustrating a method of driving a liquid crystal display panel according to an example embodiment, FIG. 6 is a flowchart illustrating a process in which a common voltage and a gate-off voltage applied to a liquid crystal display pixel are adjusted according to the method shown in FIG. 5, and FIG. 7 is a diagram illustrating an example embodiment in which the common voltage and the gate-off voltage applied to a liquid crystal display pixel are adjusted according to the method shown in FIG. 5.

Referring to FIGS. 5-7, the liquid crystal display panel that includes the liquid crystal display pixel 10, the switching transistor TR, and the storage capacitor CST may be driven according to the method of FIG. 5. The liquid crystal display pixel 10 includes the liquid crystal structure LCS, and the liquid crystal structure LCS includes a pixel electrode PE, a liquid crystal layer LCY, and a common electrode CE. The switching transistor TR is connected between the pixel electrode PE of the liquid crystal structure LCS and a data-line DL, and the storage capacitor CST is connected to the pixel electrode PE of the liquid crystal structure LCS.

The method of FIG. 5 may calculate an accumulated driving time of the liquid crystal display panel by accumulating (or calculating) a driving time of the liquid crystal display panel (S110). For example, the method of FIG. 5 may calculate the accumulated driving time of the liquid crystal display panel by increasing the accumulated driving time of the liquid crystal display panel by one for every hour the liquid crystal display panel is driven. The accumulated driving time of the liquid crystal display panel may be written into a memory block including a non-volatile memory device (e.g., a flash memory device, etc.), and the accumulated driving time of the liquid crystal display panel may be read from the memory block when the liquid crystal display panel is booted. Because the accumulated driving time of the liquid crystal display panel is updated and stored in the memory block, the accumulated driving time of the liquid crystal display panel may be checked in real-time by accessing (or reading) the memory block. For example, the accumulated driving time of the liquid crystal display panel may be continually updated to be compared with first through (k)-th deterioration reference times 1RT through kRT, where k is an integer greater than or equal to 2. Subsequently, the accumulated driving time of the liquid crystal display panel may be checked to determine whether or not it has reached the first through (k)-th deterioration reference times 1RT through kRT (S120), and the gate-off voltage VSS applied to the gate terminal of the switching transistor TR and the common voltage VCOM applied to the common electrode CE may be sequentially changed (e.g., reduced) (S130) when the accumulated driving time of the liquid crystal display panel sequentially reaches the first through (k)-th deterioration reference times 1RT through kRT. In example embodiments, the gate-on voltage VON applied to the gate terminal of the switching transistor TR may not be changed (e.g., may be maintained) even when the accumulated driving time of the liquid crystal display panel sequentially reaches the first through (k)-th deterioration reference times 1RT through kRT.

A process in which the common voltage and the gate-off voltage applied to the liquid crystal display pixel 10 are adjusted is shown in FIG. 6. As shown in FIGS. 6 and 7, the method of FIG. 5 may check the accumulated driving time of the liquid crystal display panel (S210) and may determine whether or not the accumulated driving time of the liquid crystal display panel has reached the first deterioration reference time 1RT (S220). When the accumulated driving time of the liquid crystal display panel has not reached the first deterioration reference time 1RT, the method of FIG. 5 may continue to update the accumulated driving time of the liquid crystal display panel (e.g., may continue to accumulate the driving time of the liquid crystal display panel). When the accumulated driving time of the liquid crystal display panel has reached the first deterioration reference time 1RT, the method of FIG. 5 may change (e.g., may reduce) the gate-off voltage VSS applied to the gate terminal of the switching transistor TR and the common voltage VCOM applied to the common electrode CE of the liquid crystal structure LCS to a first gate-off voltage VS(1) and a first common voltage VC(1), respectively (S230). As shown in FIG. 7, when the accumulated driving time of the liquid crystal display panel reaches the first deterioration reference time 1RT, the method of FIG. 5 may reduce the gate-off voltage VSS applied to the gate terminal of the switching transistor TR to the first gate-off voltage VS(1) and may reduce the common voltage VCOM applied to the common electrode CE to the first common voltage VC(1).

After performing the steps S210, S220, and S230, the method of FIG. 5 may sequentially check whether the accumulated driving time of the liquid crystal display panel has reached the second through (k−1)-th deterioration reference times 2RT through k-1RT and, when the accumulated driving time of the liquid crystal display panel has reached the second or greater deterioration reference time 2RT, may sequentially change the gate-off voltage VSS applied to the gate terminal of the switching transistor TR and the common voltage VCOM applied to the common electrode CE. For example, the method of FIG. 5 may perform operations that are similar to the steps S210, S220, and S230 for each of the second through (k−1)-th deterioration reference times 2RT through k-1RT. Subsequently, the method of FIG. 5 may check the accumulated driving time of the liquid crystal display panel (S240) and may determine whether or not the accumulated driving time of the liquid crystal display panel reaches the (k)-th deterioration reference time kRT (S250). When the accumulated driving time of the liquid crystal display panel has not reached the (k)-th deterioration reference time kRT, the method of FIG. 5 may continue to update the accumulated driving time of the liquid crystal display panel. When the accumulated driving time of the liquid crystal display panel has reached the (k)-th deterioration reference time kRT, the method of FIG. 5 may change (e.g., may reduce) the gate-off voltage VSS applied to the gate terminal of the switching transistor TR and the common voltage VCOM applied to the common electrode CE of the liquid crystal structure LCS to a (k)-th gate-off voltage VS(k) and a (k)-th common voltage VC(k), respectively (S260). As described above, the method of FIG. 5 may sequentially compare the accumulated driving time of the liquid crystal display panel with the first through (k)-th deterioration reference times 1RT through kRT. The second deterioration reference time 2RT may be greater than the first deterioration reference time 1RT, the third deterioration reference time 3RT may be greater than the second deterioration reference time 2RT, and the (k)-th deterioration reference time kRT may be greater than the (k−1)-th deterioration reference time k-1RT. For example, the method of FIG. 5 may compare the accumulated driving time of the liquid crystal display panel with the (m−1)-th deterioration reference time m-1RT, where m is an integer between 1 and k, and may then compare the accumulated driving time of the liquid crystal display panel with the (m)-th deterioration reference time mRT after the accumulated driving time of the liquid crystal display panel becomes greater than the (m−1)-th deterioration reference time m-1RT, where the (m)-th deterioration reference time mRT is greater than (m−1)-th deterioration reference time m-1RT.

As described above, the method of FIG. 5 may sequentially reduce the gate-off voltage VSS applied to the gate terminal of the switching transistor TR as the accumulated driving time of the liquid crystal display panel sequentially reaches the first through (k)-th deterioration reference times 1RT through kRT. In an example embodiment, the method of FIG. 5 may sequentially reduce the gate-off voltage VSS in an order of the first through (k)-th gate-off voltages VS(1) through VS(k) as the accumulated driving time of the liquid crystal display panel sequentially reaches the first through (k)-th deterioration reference times 1RT through kRT, where the first through (k)-th gate-off voltages VS(1) through VS(k) correspond to (e.g., are mapped to) the first through (k)-th deterioration reference times 1RT through kRT, respectively.

In another example embodiment, the method of FIG. 5 may sequentially reduce the gate-off voltage VSS by a reduction amount (e.g., a predetermined reduction amount) as the accumulated driving time of the liquid crystal display panel sequentially reaches the first through (k)-th deterioration reference times 1RT through kRT. The reduction amount may be constant as the accumulated driving time of the liquid crystal display panel sequentially reaches the first through (k)-th deterioration reference times 1RT through kRT. In other embodiments, the reduction amount may differ as the accumulated driving time of the liquid crystal display panel sequentially reaches the first through (k)-th deterioration reference times 1RT through kRT. Thus, a voltage difference between the gate-on voltage VON and the gate-off voltage VSS that are applied to the gate terminal of the switching transistor TR may increase as the gate-off voltage VSS is reduced. As a result, a kickback phenomenon occurring when a state of the switching transistor TR is changed from a turn-on state to a turn-off state may increase, causing the residual DC charges TCHR that are trapped near the pixel electrode PE of the liquid crystal structure LCS to be eliminated or substantially reduced. The method of FIG. 5 may prevent or mitigate occurrence of the yellowing phenomenon in the liquid crystal display panel by reducing the gate-off voltage VSS applied to the gate terminal of the switching transistor TR to eliminate or substantially reduce an effect of the residual DC charges TCHR.

In addition, the method of FIG. 5 may sequentially reduce the common voltage VCOM applied to the common electrode CE of the liquid crystal structure LCS as the accumulated driving time of the liquid crystal display panel sequentially reaches the first through (k)-th deterioration reference times 1RT through kRT. In an example embodiment, the method of FIG. 5 may sequentially reduce the common voltage VCOM in an order from the first through (k)-th common voltages VC(1) through VC(k) as the accumulated driving time of the liquid crystal display panel sequentially reaches the first through (k)-th deterioration reference times 1RT through kRT, where the first through (k)-th common voltages VC(1) through VC(k) are mapped to the first through (k)-th deterioration reference times 1RT through kRT, respectively.

In another example embodiment, the method of FIG. 5 may sequentially reduce the common voltage VCOM by a reduction amount as the accumulated driving time of the liquid crystal display panel sequentially reaches the first through (k)-th deterioration reference times 1RT through kRT. The reduction amount may be constant as the accumulated driving time of the liquid crystal display panel sequentially reaches the first through (k)-th deterioration reference times 1RT through kRT. In other embodiments, the reduction amount may differ as the accumulated driving time of the liquid crystal display panel sequentially reaches the first through (k)-th deterioration reference times 1RT through kRT. Thus, a luminance change (e.g., the luminance reduction) of the blue color display pixel 10 may be smaller than a luminance change (e.g., the luminance reduction) of the red color display pixel 10 and a luminance change (e.g., the luminance reduction) of the green color display pixel 10 as the common voltage VCOM applied to the common electrode CE of the liquid crystal structure LCS is reduced. As a result, the method of FIG. 5 may additionally prevent or mitigate occurrence of the yellowing phenomenon in the liquid crystal display panel based on a difference between the luminance change of the blue color display pixel 10 and the luminance changes of the red color display pixel 10 and the green color display pixel 10.

As described above, the method of FIG. 5 may prevent or mitigate occurrence of the yellowing phenomenon in which the image displayed by the liquid crystal display panel becomes slightly yellow as the accumulated driving time of the liquid crystal display panel increases by calculating the accumulated driving time of the liquid crystal display panel by accumulating the driving time of the liquid crystal display panel and by sequentially changing (e.g., reducing) the gate-off voltage VSS applied to the gate terminal of the switching transistor TR and the common voltage VCOM applied to the common electrode CE of the liquid crystal structure LCS as the accumulated driving time of the liquid crystal display panel sequentially reaches the first through (k)-th deterioration reference times 1RT through kRT. For example, as the liquid crystal display panel deteriorates, the method of FIG. 5 may sequentially change (e.g., may reduce) the gate-off voltage VSS applied to the gate terminal of the switching transistor TR and the common voltage VCOM applied to the common electrode CE of the liquid crystal structure LCS. Thus, the method of FIG. 5 may prevent or mitigate the yellowing phenomenon more effectively as compared to a method of changing only the gate-off voltage VSS applied to the gate terminal of the switching transistor TR or a method of changing only the common voltage VCOM applied to the common electrode CE of the liquid crystal structure LCS. As a result, the method of FIG. 5 may provide a high-quality image to a viewer even as the liquid crystal display panel deteriorates.

In example embodiments, the method of FIG. 5 may change the common voltage VCOM applied to the common electrode CE of the liquid crystal structure LCS after changing the gate-off voltage VSS applied to the gate terminal of the switching transistor TR. For example, the method of FIG. 5 may evaluate a degree of deterioration of the liquid crystal display panel according to the accumulated driving time of the liquid crystal display panel, may determine the first through (k)-th gate-off voltages VS(1) through VS(k) according to the accumulated driving time of the liquid crystal display panel based on the evaluation, and may then determine which of the first through (k)-th common voltages VC(1) through VC(k) should be applied according to the accumulated driving time of the liquid crystal display panel by checking the luminance curve of the liquid crystal display pixel 10 when one of the first through (k)-th gate-off voltages VS(1) through VS(k) is applied based on the degree of the deterioration of the liquid crystal display panel. However, a method of mapping the first through (k)-th gate-off voltages VS(1) through VS(k) and the first through (k)th common voltages VC(1) through VC(k) to the first through (k)-th deterioration reference times 1RT through kRT is not limited thereto.

Figure 8:
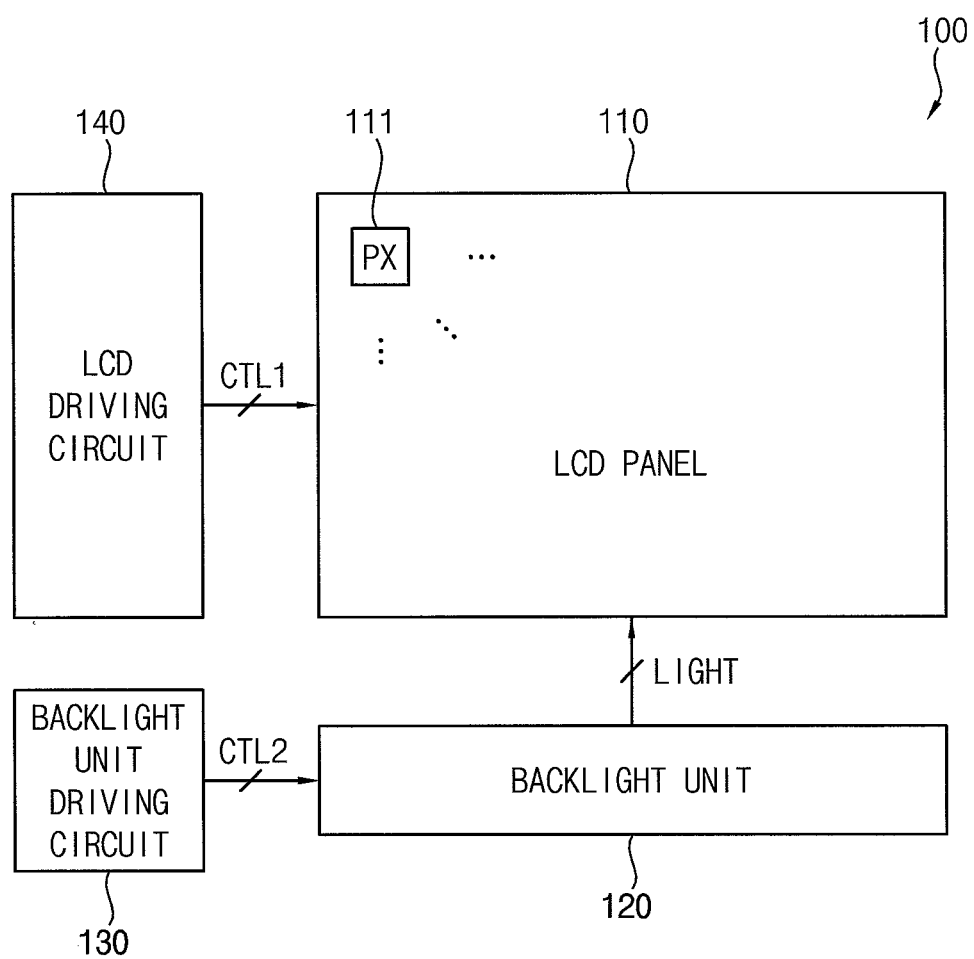
FIG. 8 is a block diagram illustrating a liquid crystal display device according to an example embodiment.
Figure 9:
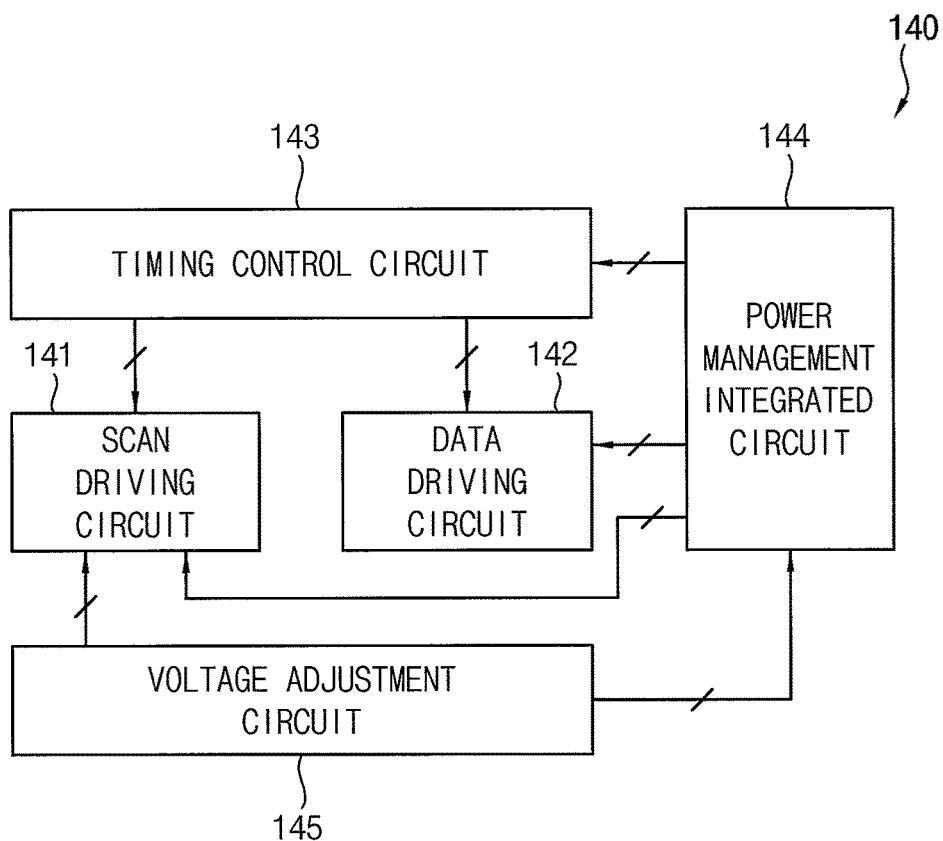
FIG. 9 is a block diagram illustrating an example embodiment of a liquid crystal display panel driving circuit included in the liquid crystal display device shown in FIG. 8.
Figure 10:
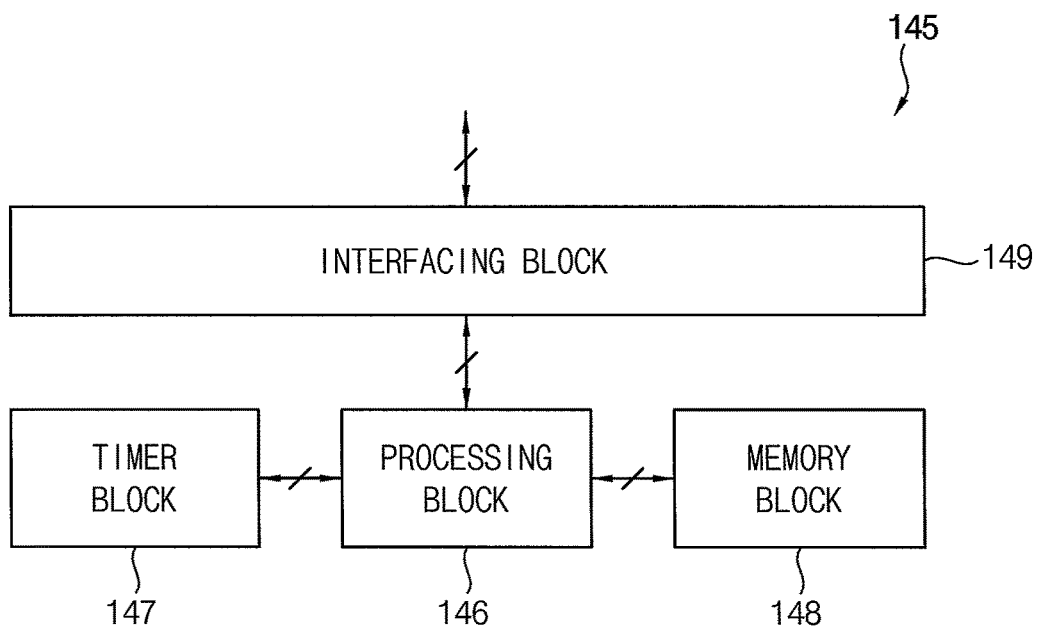
FIG. 10 is a block diagram illustrating an example embodiment of a voltage adjustment circuit included in the liquid crystal display panel driving circuit shown in FIG. 9.
Figure 11:
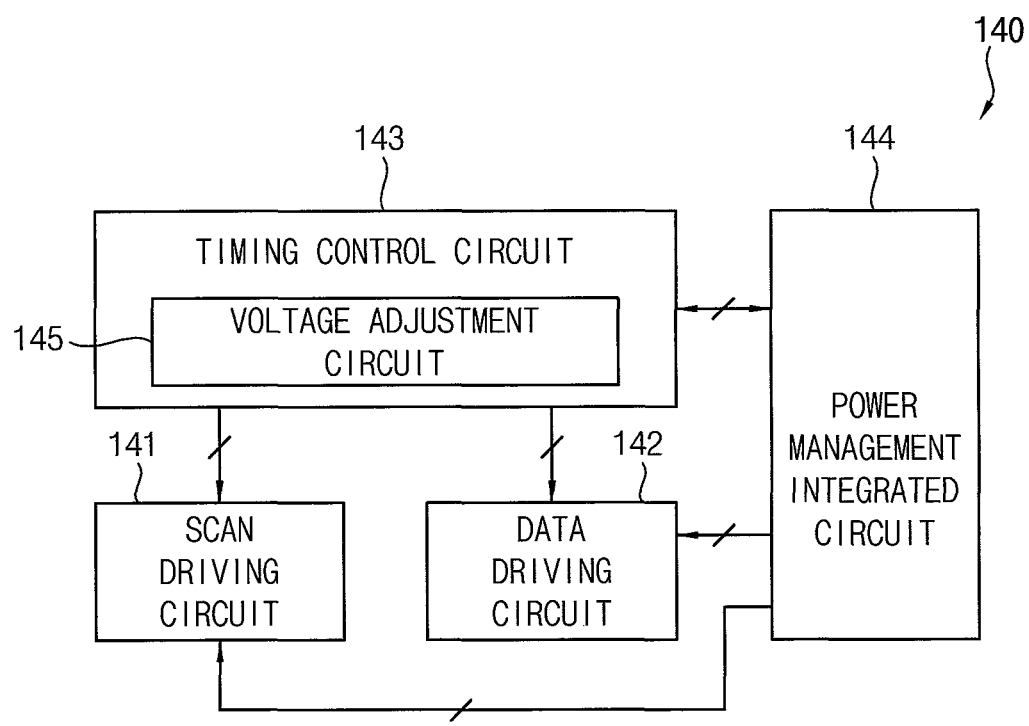
FIG. 11 is a block diagram illustrating another example embodiment of a liquid crystal display panel driving circuit included in the liquid crystal display device shown in FIG. 8.

FIG. 8 is a block diagram illustrating a liquid crystal display device according to example embodiments, FIG. 9 is a block diagram illustrating an example of a liquid crystal display panel driving circuit included in the liquid crystal display device of FIG. 8, FIG. 10 is a block diagram illustrating an example of a voltage adjustment circuit included in the liquid crystal display panel driving circuit of FIG. 9, and FIG. 11 is a block diagram illustrating another example of a liquid crystal display panel driving circuit included in the liquid crystal display device of FIG. 8.

Referring to FIGS. 8-11, the liquid crystal display device 100 may include a liquid crystal display (LCD) panel 110, a backlight (e.g., a backlight unit) 120, a backlight driver (e.g., a backlight unit driving circuit) 130, and a liquid crystal display panel driver (e.g., a liquid crystal display panel driving circuit) 140.

The liquid crystal display panel 110 may include a plurality of liquid crystal display pixels 111. Each of the liquid crystal display pixels 111 may include a liquid crystal structure, which includes a pixel electrode, a liquid crystal layer, and a common electrode, a switching transistor connected between the pixel electrode of the liquid crystal structure and a data-line, and a storage capacitor connected to the pixel electrode of the liquid crystal structure. In example embodiments, the liquid crystal display pixels 111 may be arranged in various suitable patterns on the liquid crystal display panel 110. The backlight 120 may provide light (indicated by LIGHT in FIG. 8) to the liquid crystal display panel 110. The backlight driver 130 may drive the backlight 120 (indicated by CTL2). The liquid crystal display panel driver 140 may drive the liquid crystal display panel 110 (indicated by CTL1). In some example embodiments, the backlight driver 130 may be implemented in the liquid crystal display panel driver 140.

In an example embodiment, the liquid crystal display panel driver 140 may calculate an accumulated driving time of the liquid crystal display panel 110 by accumulating a driving time of the liquid crystal display panel 110 and may reduce a gate-off voltage applied to a gate terminal of the switching transistor and a common voltage applied to a common electrode of the liquid crystal structure when the accumulated driving time of the liquid crystal display panel 110 reaches a deterioration reference time. In another example embodiment, the liquid crystal display panel driver 140 may calculate the accumulated driving time of the liquid crystal display panel 110 by accumulating the driving time of the liquid crystal display panel 110 and may sequentially reduce the gate-off voltage and the common voltage as the accumulated driving time of the liquid crystal display panel 110 sequentially reaches first through (k)-th deterioration reference times. Because deterioration of the switching transistor is accelerated when a gate-on voltage applied to the gate terminal of the switching transistor is increased, the liquid crystal display panel driver 140 may not change the gate-on voltage applied to the gate terminal of the switching transistor.

In an example embodiment, when the accumulated driving time of the liquid crystal display panel 110 reaches the deterioration reference time, the liquid crystal display panel driver 140 may reduce the gate-off voltage applied to the gate terminal of the switching transistor from a first gate-off voltage to a second gate-off voltage that is lower than the first gate-off voltage and may reduce the common voltage applied to the common electrode of the liquid crystal structure from a first common voltage to a second common voltage that is lower than the first common voltage. In another example embodiment, as the accumulated driving time of the liquid crystal display panel 110 sequentially reaches the first through (k)-th deterioration reference times, the liquid crystal display panel driver 140 may sequentially reduce the gate-off voltage applied to the gate terminal of the switching transistor included in the liquid crystal display pixel 111 in the order of the first through (k)-th gate-off voltages, which are mapped to the first through (k)-th deterioration reference times, respectively, and may sequentially reduce the common voltage applied to the common electrode of the liquid crystal structure included in the liquid crystal display pixel 111 in the order of the first through (k)-th common voltages, which are mapped to the first through (k)-th deterioration reference times, respectively. In another example embodiment, as the accumulated driving time of the liquid crystal display panel 110 sequentially reaches the first through (k)-th deterioration reference times, the liquid crystal display panel driver 140 may sequentially reduce the gate-off voltage applied to the gate terminal of the switching transistor by a reduction amount (e.g., a predetermined reduction amount) and may sequentially reduce the common voltage applied to the common electrode of the liquid crystal structure by a reduction amount (e.g., a predetermined reduction amount). In some embodiments, the reduction amount of the gate-off voltage may be constant for each of the first through (k)-th deterioration reference times. In some embodiments, the reduction amount of the gate-off voltage may differ for each of the first through (k)-th deterioration reference times. In some embodiments, the reduction amount of the common voltage may be constant for each of the first through (k)-th deterioration reference times. In some embodiments, the reduction amount of the common voltage may differ for each of the first through (k)-th deterioration reference times.

As described above, as the liquid crystal display panel 110 deteriorates, the liquid crystal display panel driver 140 may eliminate or mitigate an effect of residual DC charges that are trapped near the pixel electrode of the liquid crystal structure by reducing the gate-off voltage applied to the gate terminal of the switching transistor and may then reduce the common voltage applied to the common electrode of the liquid crystal structure. Thus, the liquid crystal display panel driver 140 may prevent or mitigate occurrence of a yellowing phenomenon in the liquid crystal display panel 110 even when the luminance curve of the liquid crystal display pixel 111 changes as the liquid crystal display panel 110 deteriorates.

As illustrated in FIG. 9, the liquid crystal display panel driver 140 may include a scan driver (e.g., a scan driving circuit) 141, a data driver (e.g., a data driving circuit) 142, a timing controller (e.g., a timing control circuit) 143, a power manager (e.g., a power management integrated circuit) 144, and a voltage adjuster (e.g., a voltage adjustment circuit) 145. The liquid crystal display panel 110 may be connected to the scan driver 141 via scan-lines. Thus, the scan driver 141 may provide a scan signal corresponding to the gate-off voltage and the gate-on voltage to the liquid crystal display panel 110 via the scan-lines. The liquid crystal display panel 110 may be connected to the data driver 142 via data-lines. Thus, the data driver 142 may provide a data signal corresponding to the pixel voltage to the liquid crystal display panel 110 via the data-lines. The timing controller 143 may generate control signals to control the scan driver 141 and the data driver 142. In some example embodiments, the timing controller 143 may receive image data from an external component, may perform processing (e.g., data compensation processing, etc.) on the image data, and may provide the processed image data to the data driver 142. The power manager 144 may provide source power to the scan driver 141, the data driver 142, and the timing controller 143. The voltage adjuster 145 may interact with the scan driver 141 and the power manager 144 to reduce the gate-off voltage applied to the gate terminal of the switching transistor and the common voltage applied to the common electrode of the liquid crystal structure based on the accumulated driving time of the liquid crystal display panel 110.

For example, when the accumulated driving time of the liquid crystal display panel 110 reaches the deterioration reference time, the voltage adjuster 145 may control the scan driver 141 to reduce the gate-off voltage applied to the gate terminal of the switching transistor and may control the power manager 144 to reduce the common voltage applied to the common electrode of the liquid crystal structure. For example, as the accumulated driving time of the liquid crystal display panel 110 sequentially reaches the first through (k)-th deterioration reference times, the voltage adjuster 145 may control the scan driver 141 to reduce the gate-off voltage applied to the gate terminal of the switching transistor and may control the power manager 144 to reduce the common voltage applied to the common electrode of the liquid crystal structure. In an example embodiment and as illustrated in FIG. 9, the voltage adjuster 145 may be implemented separately (e.g., independently) from the timing controller 143. In another example embodiment and as illustrated in FIG. 11, the voltage adjuster 145 may be implemented in the timing controller 143.

In some example embodiments and as illustrated in FIG. 10, the voltage adjuster 145 may include a processing block 146, a timer block 147, a memory block 148, and an interfacing block 149. The processing block 146 may process an entire operation of the voltage adjuster 145. The timer block 147 may calculate the accumulated driving time of the liquid crystal display panel 110. The memory block 148 may store the accumulated driving time of the liquid crystal display panel 110. For example, the memory block 148 may include a non-volatile memory device, such as a flash memory device. The interfacing block 149 may perform an interfacing operation between the voltage adjuster 145 and other components (e.g., the scan driver 141, the power manager 144, etc.).

For example, the processing block 146 may read the accumulated driving time of the liquid crystal display panel 110 from the memory block 148 when the liquid crystal display panel 110 is booted. Subsequently, the processing block 146 may accumulate the driving time of the liquid crystal display panel 110 (e.g., may update the accumulated driving time of the liquid crystal display panel 110) by operating the timer block 147 when the liquid crystal display panel 110 is booted. The processing block 146 may write the accumulated driving time of the liquid crystal display panel 110 into the memory block 148 while updating the accumulated driving time of the liquid crystal display panel 110. In an example embodiment, the processing block 146 may determine whether or not the accumulated driving time of the liquid crystal display panel 110 has reached the deterioration reference time while updating the accumulated driving time of the liquid crystal display panel 110. When the accumulated driving time of the liquid crystal display panel 110 has reached the deterioration reference time, the processing block 146 may interact with the scan driver 141 through the interfacing block 149 to reduce the gate-off voltage applied to the gate terminal of the switching transistor and may interact with the power manager 144 through the interfacing block 149 to reduce the common voltage applied to the common electrode of the liquid crystal structure.

In another example embodiment, the processing block 146 may determine whether or not the accumulated driving time of the liquid crystal display panel 110 has sequentially reached the first through (k)-th deterioration reference times while updating the accumulated driving time of the liquid crystal display panel 110. As the accumulated driving time of the liquid crystal display panel 110 sequentially reaches the first through (k)-th deterioration reference times, the processing block 146 may interact with the scan driver 141 through the interfacing block 149 to sequentially reduce the gate-off voltage applied to the gate terminal of the switching transistor and may interact with the power manager 144 through the interfacing block 149 to sequentially reduce the common voltage applied to the common electrode of the liquid crystal structure. However, a structure and an operation of the voltage adjuster 145 are not limited thereto.

In brief, in an example embodiment, the liquid crystal display device 100 may prevent or mitigate occurrence of the yellowing phenomenon in which the image displayed by the liquid crystal display panel 110 becomes slightly yellow as the accumulated driving time of the liquid crystal display panel 110 increases by calculating the accumulated driving time of the liquid crystal display panel 110 by accumulating the driving time of the liquid crystal display panel 110 and by changing (e.g., reducing) the gate-off voltage applied to the gate terminal of the switching transistor and the common voltage applied to the common electrode of the liquid crystal structure when the accumulated driving time of the liquid crystal display panel 110 reaches the deterioration reference time. In another example embodiment, the liquid crystal display device 100 may prevent or mitigate occurrence of the yellowing phenomenon in which the image displayed by the liquid crystal display panel 110 becomes slightly yellow as the accumulated driving time of the liquid crystal display panel 110 increases by calculating the accumulated driving time of the liquid crystal display panel 110 by accumulating the driving time of the liquid crystal display panel 110 and by sequentially changing (e.g., reducing) the gate-off voltage applied to the gate terminal of the switching transistor included and the common voltage applied to the common electrode of the liquid crystal structure as the accumulated driving time of the liquid crystal display panel 110 sequentially reaches the first through (k)-th deterioration reference times. Thus, the liquid crystal display device 110 may provide a high-quality image to a viewer even when the liquid crystal display panel 110 deteriorates. For example, because the liquid crystal display device 100 prevents or mitigates the yellowing phenomenon, which is relatively noticeable when displaying a low-grayscale image, by changing (e.g., reducing) both the gate-off voltage applied to the gate terminal of the switching transistor and the common voltage applied to the common electrode of the liquid crystal structure, the liquid crystal display device 100 may omit additional components or may forego design changes of existing components. Thus, the liquid crystal display device 100 according to example embodiments has an advantage in terms of cost reduction. And although it is described above that the liquid crystal display device 100 includes the liquid crystal display panel 110, the backlight 120, the backlight driver 130, and the liquid crystal display panel driver 140, in some example embodiments the liquid crystal display device 100 may further include other components (e.g., a deterioration compensator (or deterioration compensation circuit) for performing deterioration compensation on the liquid crystal display pixels 111 of the liquid crystal display panel 110).

Figure 12:
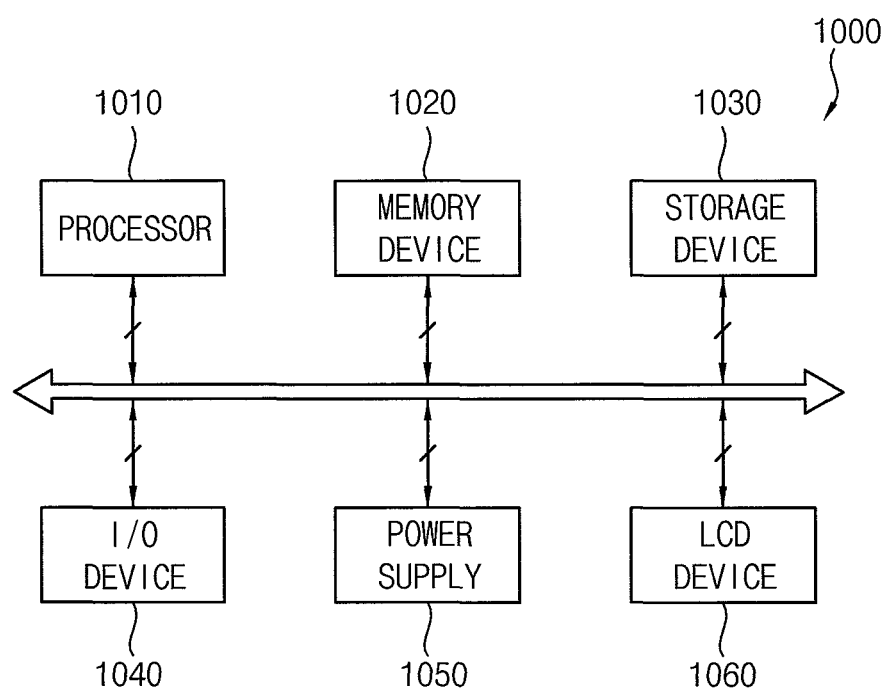
FIG. 12 is a block diagram illustrating an electronic device according to an example embodiment.
Figure 13:
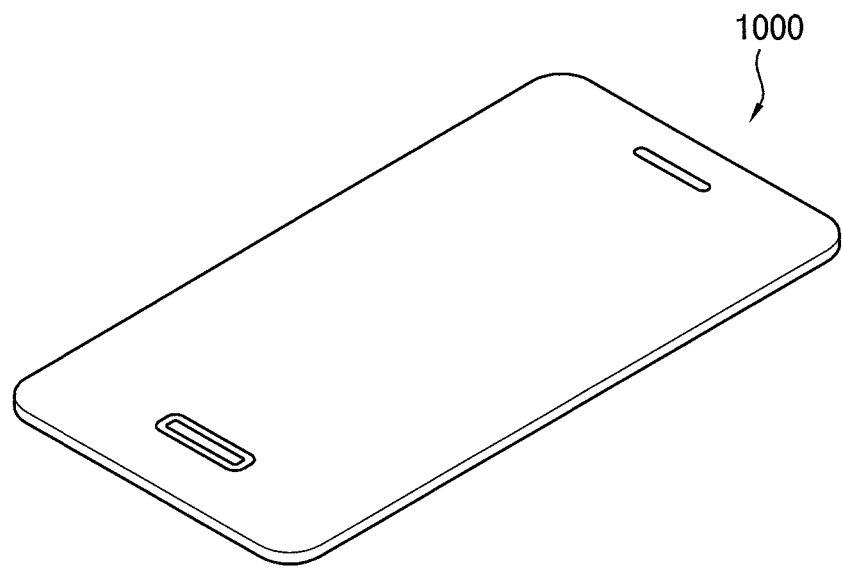
FIG. 13 is a diagram illustrating an example embodiment in which the electronic device shown in FIG. 12 is implemented as a smart phone.
Figure 14:
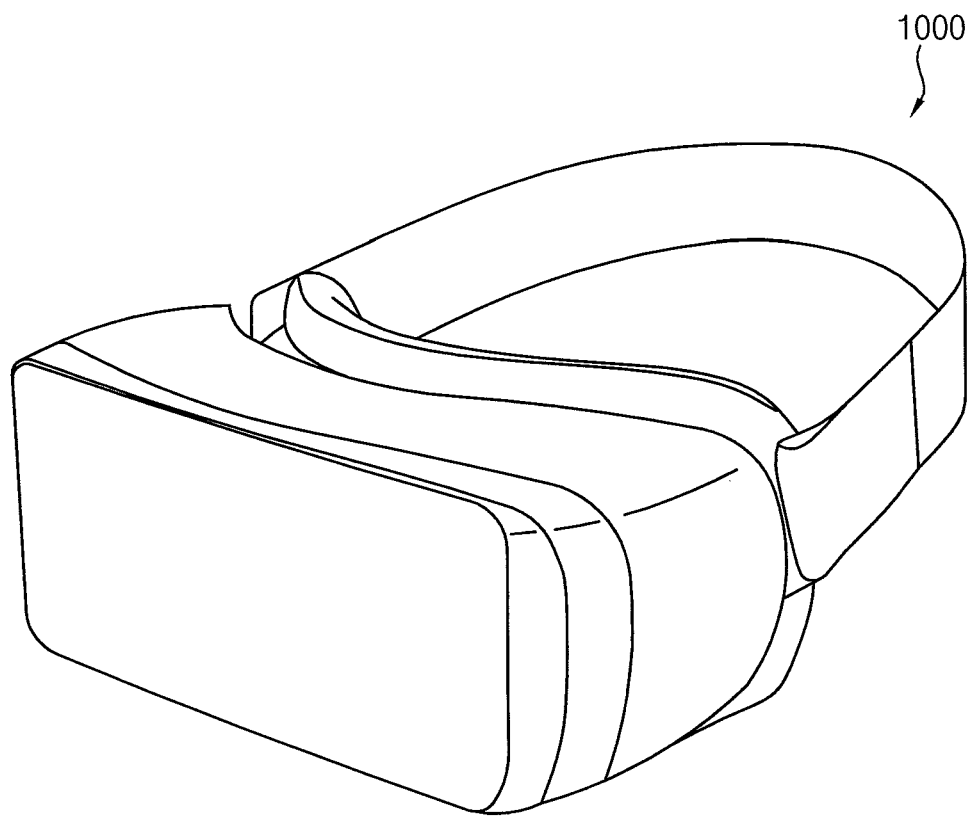
FIG. 14 is a diagram illustrating an example embodiment in which the electronic device shown in FIG. 12 is implemented as a head mounted display (HMD) device.

FIG. 12 is a block diagram illustrating an electronic device according to example embodiments, FIG. 13 is a diagram illustrating an example in which the electronic device shown in FIG. 12 is implemented as a smart phone, and FIG. 14 is a diagram illustrating an example in which the electronic device shown in FIG. 12 is implemented as a head mounted display (HMD) device.

Referring to FIGS. 12-14, the electronic device 1000 may include a processor 1010, a memory device 1020, a storage device 1030, an input/output (I/O) device 1040, a power supply 1050, and a liquid crystal display device 1060. The liquid crystal display device 1060 may be the liquid crystal display device 100 shown in FIG. 8. The electronic device 1000 may further include a plurality of ports for communicating with a video card, a sound card, a memory card, a universal serial bus (USB) device, other electronic devices, etc. In an example embodiment and as illustrated in FIG. 13, the electronic device 1000 may be implemented as a smart phone. In another example embodiment and as illustrated in FIG. 14, the electronic device 1000 may be implemented as an HMD device. However, the electronic device 1000 is not limited thereto. As other examples, the electronic device 1000 may be implemented as a television, a cellular phone, a video phone, a smart pad, a smart watch, a tablet PC, a car navigation system, a computer monitor, a laptop, etc.

The processor 1010 may perform various computing functions. The processor 1010 may be a microprocessor, a central processing unit (CPU), an application processor (AP), etc. The processor 1010 may be coupled to other components via an address bus, a control bus, a data bus, etc. Further, the processor 1010 may be coupled to an extended bus, such as a peripheral component interconnection (PCI) bus. The memory device 1020 may store data for operations of the electronic device 1000. For example, the memory device 1020 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile DRAM device, etc. The storage device 1030 may be a solid state drive (SSD) device, a hard disk drive (HDD) device, a CD-ROM device, etc. The I/O device 1040 may be an input device, such as a keyboard, a keypad, a mouse device, a touchpad, a touch-screen, etc., and an output device, such as a printer, a speaker, etc. In some example embodiments, the liquid crystal display device 1060 may be included in the I/O device 1040. The power supply 1050 may provide power for operations of the electronic device 1000.

The liquid crystal display device 1060 may be coupled to other components via the buses or other communication links. As described above, the liquid crystal display device 1060 may include a liquid crystal display panel, a backlight, a backlight driver, and a liquid crystal display panel driver. The liquid crystal display panel may include a liquid crystal display pixel, which includes a liquid crystal structure, a switching transistor, which is connected between a pixel electrode of the liquid crystal structure and a data-line, and a storage capacitor, which is connected to the pixel electrode of the liquid crystal structure. The backlight may provide light to the liquid crystal display panel. The backlight driver may drive the backlight. The liquid crystal display panel driver may drive the liquid crystal display panel. The liquid crystal display panel driver may calculate an accumulated driving time of the liquid crystal display panel by accumulating a driving time of the liquid crystal display panel and may reduce a gate-off voltage applied to a gate terminal of the switching transistor and a common voltage applied to a common electrode of the liquid crystal structure when the accumulated driving time of the liquid crystal display panel reaches a deterioration reference time. In other embodiments, the liquid crystal display panel driving circuit may calculate the accumulated driving time of the liquid crystal display panel by accumulating the driving time of the liquid crystal display panel and may sequentially reduce the gate-off voltage and the common voltage when the accumulated driving time of the liquid crystal display panel sequentially reaches first through (k)-th deterioration reference times. The liquid crystal display panel driving circuit may not change a gate-on voltage applied to the gate terminal of the switching transistor. To this end, the liquid crystal display panel driver may include a scan driver, a data driver, a timing controller, a power manager, and a voltage adjuster. The scan driver may provide a scan signal corresponding to the gate-off voltage and the gate-on voltage to the liquid crystal display panel via scan-lines. The data driver may provide a data signal corresponding to a pixel voltage to the liquid crystal display panel via data-lines. The timing controller may control the scan driver and the data driver. The power manager may provide source power to the scan driver, the data driver, and the timing controller. The voltage adjuster may reduce, by interacting with the scan driver and the power manager, the common voltage applied to the common electrode of the liquid crystal structure included in the liquid crystal display pixel and the gate-off voltage applied to the gate terminal of the switching transistor included in the liquid crystal display pixel based on the accumulated driving time of the liquid crystal display panel. Thus, the liquid crystal display device 1060 may provide a high-quality image to a viewer even when the accumulated driving time of the liquid crystal display panel increases (e.g., even when the liquid crystal display panel deteriorates). Because the liquid crystal display device 1060 is described above, duplicated description related thereto will not be repeated.

The present invention may be applied to, as some examples, a liquid crystal display device and an electronic device including the liquid crystal display device. For example, the present invention may be applied to a cellular phone, a smart phone, a video phone, a smart pad, a smart watch, a tablet PC, a car navigation system, a television, a computer monitor, a laptop, a digital camera, an HMD device, an MP3 player, etc.

The foregoing is illustrative of example embodiments and is not to be construed as limiting the present invention. Although a few example embodiments have been described, those skilled in the art will readily appreciate that many modifications are possible in the example embodiments without materially departing from the aspects and features of the present invention. Accordingly, all such modifications are intended to be included within the scope of the present invention as defined in the claims and their equivalents. Therefore, it is to be understood that the foregoing is illustrative of various example embodiments and is not to be construed as being limited to the specific example embodiments disclosed, and that modifications to the disclosed example embodiments, as well as other example embodiments, are intended to be included within the scope of the appended claims and their equivalents.

What is claimed is:

1. A method of driving a liquid crystal display panel, the liquid crystal display panel comprising: a liquid crystal display pixel comprising a liquid crystal structure comprising a pixel electrode, a liquid crystal layer, and a common electrode; a switching transistor connected between the pixel electrode of the liquid crystal structure and a data-line; and a storage capacitor connected to the pixel electrode of the liquid crystal structure, the method comprising:
   reading an accumulated driving time of the liquid crystal display panel from memory;
   accumulating the driving time of the liquid crystal display panel by adding to the accumulated driving time of the liquid crystal display panel in the memory;
   determining whether or not the accumulated driving time has reached a deterioration reference time; and
   when the accumulated driving time is determined to have reached the deterioration reference time, reducing a gate-off voltage applied to a gate terminal of the switching transistor and reducing a common voltage applied to the common electrode.

2. The method of claim 1, wherein a gate-on voltage applied to the gate terminal of the switching transistor is not changed.

3. A method of driving a liquid crystal display panel, the liquid crystal display panel comprising: a liquid crystal display pixel comprising a liquid crystal structure comprising a pixel electrode, a liquid crystal layer, and a common electrode; a switching transistor connected between the pixel electrode of the liquid crystal structure and a data-line; and a storage capacitor connected to the pixel electrode of the liquid crystal structure, the method comprising:

reading an accumulated driving time of the liquid crystal display panel from memory;

accumulating the driving time of the liquid crystal display panel by adding to the accumulated driving time of the liquid crystal display panel in the memory;

determining whether or not the accumulated driving time has reached first through (k)-th deterioration reference times, wherein k is an integer greater than or equal to 2; and when the accumulated driving time is determined to have sequentially reached the first through (k)-th deterioration reference times, sequentially reducing a gate-off voltage applied to a gate terminal of the switching transistor and sequentially reducing a common voltage applied to the common electrode.

4. The method of claim 3, wherein a gate-on voltage applied to the gate terminal of the switching transistor is not changed.

5. The method of claim 4, wherein the gate-off voltage is sequentially reduced as the accumulated driving time sequentially reaches the first through (k)-th deterioration reference times, and wherein a voltage difference between the gate-on voltage and the gate-off voltage is sequentially increased as the gate-off voltage is sequentially reduced.

6. The method of claim 5, wherein the gate-off voltage is sequentially reduced in the order of first through (k)-th gate-off voltages as the accumulated driving time sequentially reaches the first through (k)-th deterioration reference times, the first through (k)-th gate-off voltages being mapped to the first through (k)-th deterioration reference times, respectively.

7. The method of claim 5, wherein the gate-off voltage is sequentially reduced by a reduction amount as the accumulated driving time sequentially reaches the first through (k)-th deterioration reference times.

8. The method of claim 7, wherein the reduction amount is constant as the accumulated driving time sequentially reaches the first through (k)-th deterioration reference times.

9. The method of claim 7, wherein the reduction amount differs as the accumulated driving time sequentially reaches the first through (k)-th deterioration reference times.

10. The method of claim 3, wherein the common voltage is sequentially reduced in the order of first through (k)-th common voltages as the accumulated driving time sequentially reaches the first through (k)-th deterioration reference times, the first through (k)-th common voltages being mapped to the first through (k)-th deterioration reference times, respectively.

11. The method of claim 3, wherein the common voltage is sequentially reduced by a reduction amount as the accumulated driving time sequentially reaches the first through (k)-th deterioration reference times.

12. The method of claim 11, wherein the reduction amount is constant as the accumulated driving time sequentially reaches the first through (k)-th deterioration reference times.

13. The method of claim 11, wherein the reduction amount differs as the accumulated driving time sequentially reaches the first through (k)-th deterioration reference times.

14. A liquid crystal display device comprising:
a liquid crystal display panel comprising:
a liquid crystal display pixel comprising a liquid crystal structure comprising a pixel electrode, a liquid crystal layer, and a common electrode;
a switching transistor connected between the pixel electrode of the liquid crystal structure and a data-line; and
a storage capacitor connected to the pixel electrode of the liquid crystal structure;
a backlight configured to provide light to the liquid crystal display panel;
a backlight driver configured to drive the backlight; and
a liquid crystal display panel driver configured to drive the liquid crystal display panel,
wherein the liquid crystal display panel driver is configured to calculate an accumulated driving time of the liquid crystal display panel by accumulating a lifetime driving time of the liquid crystal display panel, to store the accumulated driving time of the liquid crystal display panel into memory, and to reduce a gate-off voltage applied to a gate terminal of the switching transistor and a common voltage applied to the common electrode when the accumulated driving time reaches a deterioration reference time, and
wherein the liquid crystal display panel driver is configured to not change a gate-on voltage applied to the gate terminal of the switching transistor.

15. The liquid crystal display device of claim 14, wherein the liquid crystal display panel driver comprises:
a scan driver configured to provide a scan signal corresponding to the gate-off voltage and the gate-on voltage to the liquid crystal display panel via scan-lines;
a data driver configured to provide a data signal corresponding to a pixel voltage to the liquid crystal display panel via data-lines;
a timing controller configured to control the scan driver and the data driver;
a power manager configured to provide source power to the scan driver, the data driver, and the timing controller; and
a voltage adjuster configured to reduce the common voltage and the gate-off voltage based on the accumulated driving time by interacting with the scan driver and the power manager.

16. A liquid crystal display device comprising:
a liquid crystal display panel comprising:
a liquid crystal display pixel comprising a liquid crystal structure comprising a pixel electrode, a liquid crystal layer, and a common electrode;
a switching transistor connected between the pixel electrode of the liquid crystal structure and a data-line; and
a storage capacitor connected to the pixel electrode of the liquid crystal structure;
a backlight configured to provide light to the liquid crystal display panel;
a backlight driver configured to drive the backlight; and
a liquid crystal display panel driver configured to drive the liquid crystal display panel,
wherein the liquid crystal display panel driver is configured to calculate an accumulated driving time of the liquid crystal display panel by accumulating a lifetime driving time of the liquid crystal display panel, to store the accumulated driving time for the liquid crystal display panel into memory, and to sequentially reduce a gate-off voltage applied to a gate terminal of the switching transistor and a common voltage applied to the common electrode of the liquid crystal structure when the accumulated driving time sequentially reaches first through (k)-th deterioration reference times, wherein k is an integer greater than or equal to 2, and wherein the liquid crystal display panel driver is configured to not change a gate-on voltage applied to the gate terminal of the switching transistor.

17. The liquid crystal display device of claim 16, wherein the liquid crystal display panel driver comprises:
   a scan driver configured to provide a scan signal corresponding to the gate-off voltage and the gate-on voltage to the liquid crystal display panel via scan-lines;
   a data driver configured to provide a data signal corresponding to a pixel voltage to the liquid crystal display panel via data-lines;
   a timing controller configured to control the scan driver and the data driver;
   a power manager configured to provide source power to the scan driver, the data driver, and the timing controller; and
   a voltage adjuster configured to reduce the common voltage and the gate-off voltage based on the accumulated driving time by interacting with the scan driver and the power manager.

18. The liquid crystal display device of claim 16, wherein the liquid crystal display panel driver is configured to sequentially reduce the gate-off voltage in the order of first through (k)-th gate-off voltages as the accumulated driving time sequentially reaches the first through (k)-th deterioration reference times, the first through (k)-th gate-off voltages being mapped to the first through (k)-th deterioration reference times, respectively.

19. The liquid crystal display device of claim 16, wherein the liquid crystal display panel driver is configured to sequentially reduce the gate-off voltage by a reduction amount as the accumulated driving time sequentially reaches the first through (k)-th deterioration reference times.

20. The liquid crystal display device of claim 16, wherein the liquid crystal display panel driver is configured to sequentially reduce the common voltage in the order of first through (k)-th common voltages as the accumulated driving time sequentially reaches the first through (k)-th deterioration reference times, the first through (k)-th common voltages being mapped to the first through (k)-th deterioration reference times, respectively.

21. The liquid crystal display device of claim 16, wherein the liquid crystal display panel driver is configured to sequentially reduce the common voltage by a reduction amount as the accumulated driving time sequentially reaches the first through (k)-th deterioration reference times.

* * * * *